United States Patent [19]
Millar

[11] Patent Number: 5,068,993
[45] Date of Patent: Dec. 3, 1991

[54] METHOD AND APPARATUS FOR ANESTHETIZING CAUGHT FISH

[76] Inventor: John G. Millar, P.O. Box 160, Volcano, Hi. 96785

[21] Appl. No.: 593,776

[22] Filed: Oct. 5, 1990

[51] Int. Cl.[5] .......... A01K 69/00
[52] U.S. Cl. .......... 43/4; 128/200.24; 128/200.14
[58] Field of Search .......... 43/4.5, 4; 119/3; 128/203.12, 200.24, 200.14, 200.23, 200.11, 200.21, 200.18, 204.14

[56] References Cited

U.S. PATENT DOCUMENTS

| | | | |
|---|---|---|---|
| 3,593,710 | 7/1971 | Eichelman | 128/200.11 |
| 4,594,807 | 6/1986 | McQueen | 43/132.1 |
| 4,684,366 | 8/1987 | Denny et al. | 43/43.13 |
| 4,807,615 | 2/1989 | Nakagawa | 128/203.12 |

FOREIGN PATENT DOCUMENTS

| | | | |
|---|---|---|---|
| 1-144916 | 6/1989 | Japan | 119/3 |
| 8904601 | 6/1989 | PCT Int'l Appl. | 119/3 |
| 2195221 | 4/1988 | United Kingdom | 119/3 |

OTHER PUBLICATIONS

"Walnut Shells, Pharmacological Aspects of Juglone", *Toxicon*, 1963, vol. 1, pp. 235-239.

*Primary Examiner*—Richard K. Seidel
*Assistant Examiner*—James Miner
*Attorney, Agent, or Firm*—Saul Epstein

[57] ABSTRACT

A method and apparatus in a system for catching fish which rapidly anesthetizes the caught fish, preventing them from thrashing about or exerting themselves after being caught. An anesthetizing fluid, preferably an alcohol/water solution is applied to the gill or mouth area of the fish as they are brought out of the water.

18 Claims, 1 Drawing Sheet

15
13
16
14
10
11
12
21
19
17
18
20

15
13
16
14
10
11
12
21
19
17
18
20

METHOD AND APPARATUS FOR ANESTHETIZING CAUGHT FISH

BACKGROUND OF THE INVENTION

In commercial fishing, spoilage of fish flesh is a constant and major problem. Two major kinds of spoilage are often encountered: 1) The generation of substances in the flesh (bacteria) that are toxic to humans, and 2) The deterioration of the physical color and/or texture of the flesh which, while not toxic, reduces its value in the marketplace. While deteriorization of fish can occur at any point between catching and consumption, a substantial amount takes place immediately after the fish is caught and before it is refrigerated.

For example, bacteria can start to grow if the fish, after being caught, is allowed to remain on deck in a warm or hot atmosphere for a significant period of time before being refrigerated. The second kind of spoilage can occur as a result of fish exertions in thrashing about o deck. In addition, if fish are allowed to thrash about, bruising of the fish itself and of other fish can occur.

In an attempt to avoid these problems, it is common practice to stun fish by a blow to the head as soon as possible after they are brought on deck. Immobile fish are easier to tend to than active fish, thus reducing the time necessary to prepare the fish for refrigeration, and also, obviously, immobile fish do not exert themselves or bruise either themselves or other fish.

Care must be taken not to kill the fish in the stunning operation, since before each fish is chilled its gill-arch should be slit and as much blood as possible drained. If the fish's heart is not pumping, no significant blood can be drained. The business of stunning fish occupies much of a commercial fisherman's time when fishing is "fast and furious", and often the stunning is done carelessly, with the blow either being too light to stun the fish, or so heavy as to kill it. In the former event, a fish may thrash around the deck bruising itself and other fish, and/or reducing the quality of its flesh by its exertions. With large fish, such thrashing can also be dangerous to the fisherman and others on board. In addition, the time on deck of the catch is extended, thereby increasing the opportunity for bacterial contamination. If the fish is inadvertently killed, proper bleeding cannot be accomplished.

Another related problem is the brutalization of fishermen involved in the clubbing of fish and the negative public perception of this practice.

It is therefore an object of the present invention to provide an efficient and economical means for immobilizing caught fish which is easy and fast to apply, and which has little likelihood of either killing the fish or of failing to stun it, even when the fisherman is under great pressure to attend to many fish in a short period of time.

SUMMARY OF THE INVENTION

The present invention produces extremely rapid immobilization of a fish, without physicallly damaging it. The immobilization is accomplished by causing the fish to ingest an anesthetizing liquid, preferably comprised of an alcohol/water solution. The solution may be poured or sprayed into the gill openings or into the mouth as convenient. The introduction of the solution into the fish's system is preferably accomplished as soon as possible after its mouth or gills are above the water level. In the case of commercial fishing, where the fish are caught for eventual consumption, the application of the anesthetizing solution is preferably done even before the fish reaches the boat's deck. The fish on deck, therefore will not be thrashing around, possibly bruising themselves and other fish and degrading their flesh due to exertion. The possibility of injuring the fishermen is also reduced.

In its simplest preferred form, the anesthetizing solution may be stored in an "aerosol can" and directed as a spray into the gill openings of the fish as soon as they are accessible to the fisherman. This form is most suitable for sports fishermen, who can use the invention for the same purposes as would a commercial fisherman, i.e., to preserve the quality of the caught fish, and also in the context of "fish and release" fishing. A fish which has been lightly anesthetized according to the invention can be removed from the hook with less danger to the fish and the fisherman than if it is struggling, and released without damage. As an alternative to a pressurized can, the anesthetizing solution can be stored in a "pump" container, similar to those which are currently used to dispense many household and cosmetic products, such as hair spray, etc.

In commercial fishing, the anesthetizing solution is preferably stored in pressurized tanks and delivered to the point of application using pipes and hoses. Hand operated valves at the point of application or remote valves can be used as is convenient for the particular installation. The anesthetizing solution can also be gravity fed to the point of application.

A more detailed understanding of the invention can be had by reference to the following description of the presently preferred embodiments which should be read with reference to the accompanying drawing.

DETAILED DESCRIPTION OF THE INVENTION

Figure 1:
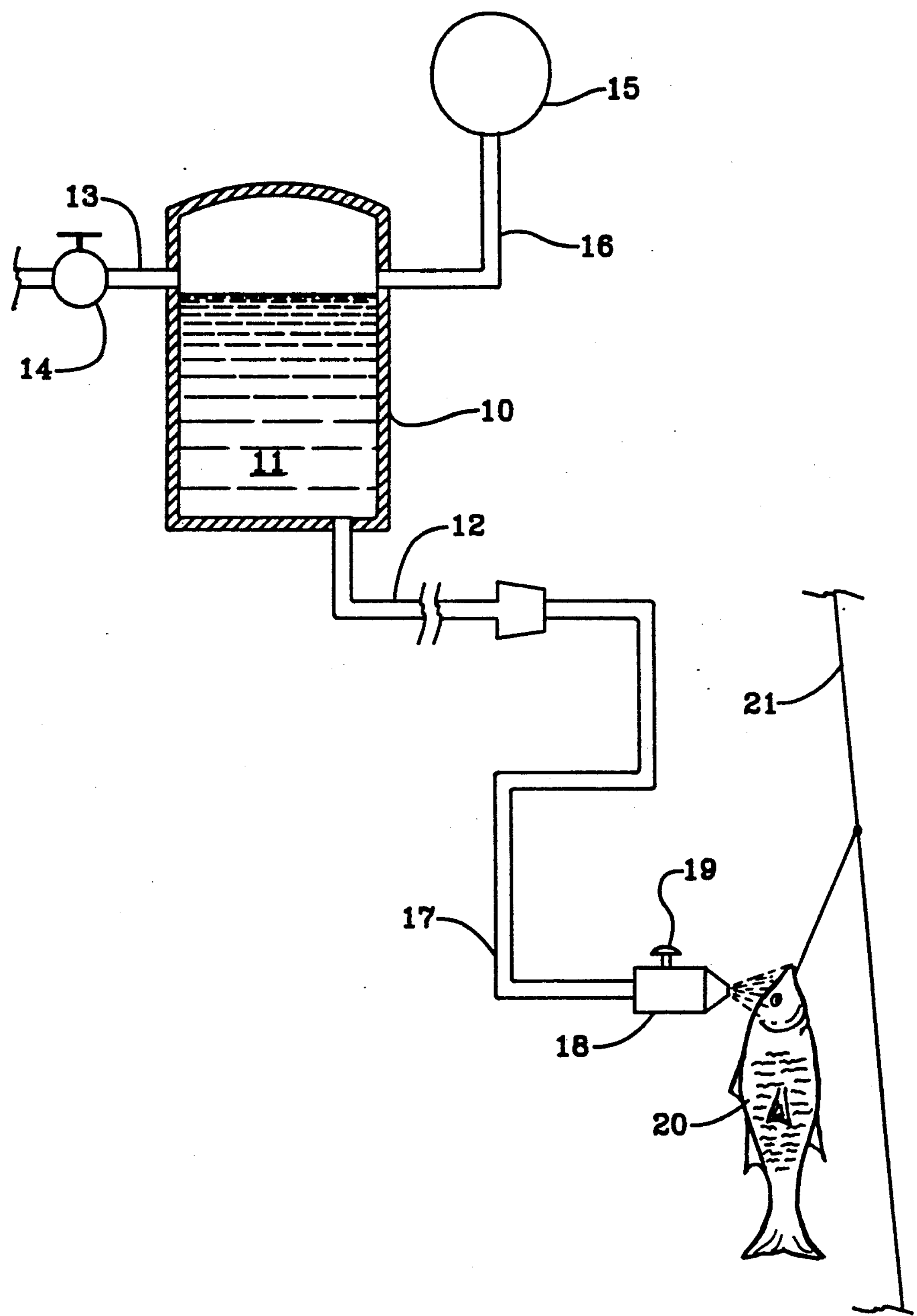
FIG. 1 is a semi-schematic depiction of a system for dispensing an anesthetizing agent according to the present invention.

A presently preferred embodiment of the invention for use by commercial fishermen is illustrated in FIG. 1. The figure shows a fish 20 being handed out of the water by line 21. The embodiment, as illustrated, includes a tank 10 which contains a supply of an anesthetizing fluid 11. The fluid is preferably an alcohol/water solution, the percentage of alcohol required being primarily dependent on the species and size of the fish being caught, and the amount of liquid to be sprayed on the fish. A 30 to 50 percent alcohol solution has been found generally to be effective, but other concentrations may prove to be optimum in particular applications. The alcohol solution will, of course, become immediately more diluted when applied to a dripping wet fish, but, on the other hand, a too concentrated solution may tend to burn or scald the fish, especially small fish. Denatured alcohol ordinarily contains poisons which tend to kill fish, and care should be used in selecting the anesthetizing agent to avoid lethal doses of toxic substances being applied. Care should also be taken in selecting the anesthetizing fluid to assure that it will not leave residues toxic to humans.

An inlet pipe 13, which is used to fill the tank with the anesthetizing fluid prior to use, may be positioned at any convenient point in the wall of the tank. Valve 14 shuts off inlet pipe 13 allowing the tank to be pressurized by compresser 15 (which is connected to tank 10 by pipe 16). An outlet pipe 12 is positioned at or near the bottom of the tank so that the pressurized contents of the tank will flow out through it.

Alternatively, the compresser 15 can be eliminated, and the tank merely vented to atmosphere. In this case, the tank should be mounted well above the point of application, e.g., above the deck of the ship, so that there will be sufficient gravity head to create the desired flow.

The outlet pipe 12 leads to the the area of the ship where the fish are brought aboard, and is coupled to flexible hose 17. A spray nozzle 18 including a manually operated valve 19 is attached to the end of the hose.

In use, a fisherman is stationed at the point on deck where the fish are brought aboard, or possibly on a platform just above sea level where the fish emerge. As each fish breaks water or comes on deck, the fisherman sprays the gill area of the fish with the anesthetizing fluid. Rather than stationing a fisherman to spray the fish manually, a fixed spray nozzle (or nozzles) with a remotely controlled valve can be aimed at the incoming line, and the valve actuated each time a fish arrives in position to be sprayed. This latter system may be particularly desirable for net caught fish, where it might be difficult for a fisherman to =in position to spray individual fish. It might be found, for netted fish, that a continuous spray of the solution is desirable. The amount of solution applied, and the most efficient method of delivering it will depend on the particular application.

As mentioned in the summary section of this application, second preferred embodiment of the invention involves the use of an aerosol or pump type container which can be carried in the hand, and the solution applied by simply pressing the valve of the aerosol container or actuating the pump of a pump type container. Any of the commonly used aerosol propellants can be used to pressurize the aerosol can. It is, of course, preferred that environmentally sound propellants be used. This embodiment is particularly suitable for individual sport fishermen.

What has been described are presently preferred embodiments of the invention, which embodiments should be taken as illustrative of the invention and not as limitations thereof. It is anticipated that various modifications and adaptations of the invention will occur to those skilled in the art, and such modifications and adaptations are intended to be within the scope of the following claims.

I claim:

1. A method for immobilizing fish which have bene caught which comprises:

providing a container containing a quantity of anesthetizing fluid , said container having an outlet coupled to a valve for controlling the flow of said anesthetizing fluid out of said container; and opening said valve and sparying he gill area of a caught fish with said anesthetizing fluid after at least the gill area of said fish has emerged front e water.

2. The method as recited in claim 1 where the anesthetizing agent in said anesthetizing fluid is alcohol.

3. The method as recited in claim 2 where the concentration of alcohol in said anesthetizing fluid is about 30 to 50 percent by volume.

4. The method as recited in claim 1 and further including the step of pressurizing said container.

5. The method as recited in claim 4 where the anesthetizing agent in said anesthetizing fluid is alcohol.

6. The method as recited in claim 5 where the concentration of alcohol in said anesthetizing fluid is about 30 to 50 percent by volume.

7. The method recited in claim 4 where said pressurization is by means of an aerosol propellant.

8. The method as recited in claim 7 where the anesthetizing agent in said anesthetizing fluid is alcohol.

9. The method as recited in claim 8 where the concentration of alcohol in said anesthetizing fluid is about 30 to 50 percent by volume.

10. In a system for catching fish which includes means for hauling caught fish out of the water, the improvement comprising an apparatus for anesthetizing the caught fish which comprises:

an enclosed container for holding an anesthetizing fluid having an outlet through which said anesthetizing fluid can flow;

a valve coupled to said outlet;

a nozzle coupled to said valve; and means for creating a pressure head on the anesthetizing fluid at said valve whereby when said valve is opened said anesthetizing fluid will flow out through said nozzle.

11. The system as recited in claim 10 where the anesthetizing agent in said anesthetizing fluid is alcohol.

12. The system as recited in claim 11 where the concentration of alcohol in said anesthetizing fluid is about 30 to 50 percent by volume.

13. The system as recited in claim 10 and further including the step of pressurizing said container.

14. The system as recited in claim 13 where the anesthetizing agent in said anesthetizing fluid is alcohol.

15. The system as recited in claim 14 where the concentration of alcohol in said anesthetizing fluid is about 30 to 50 percent by volume.

16. The system recited in claim 13 where said pressurization is by means of an aerosol propellant.

17. The system as recited in claim 16 where the anesthetizing agent in said anesthetizing fluid is alcohol.

18. The system as recited in claim 17 where the concentration of alcohol in said anesthetizing fluid is about 30 to 50 percent by volume.

* * * * *